(12) United States Patent
Kien

(10) Patent No.: US 6,820,636 B1
(45) Date of Patent: Nov. 23, 2004

(54) PLUMBING TOOL

(76) Inventor: Tai Kien, 665 School St., Lowell, MA (US) 01851

( * ) Notice: Subject to any disclaimer, the term of this patent is extended or adjusted under 35 U.S.C. 154(b) by 0 days.

(21) Appl. No.: 10/734,449

(22) Filed: Dec. 12, 2003

(51) Int. Cl.[7] .................. F16K 43/00; F16K 55/128; F16L 55/12; F16L 55/18

(52) U.S. Cl. ............. 137/317; 137/15.15; 137/315.01; 138/89; 138/90; 138/93; 138/97

(58) Field of Search ................. 137/15.15, 317, 137/318; 138/89, 90, 93, 97

(56) References Cited

U.S. PATENT DOCUMENTS

| | | | | |
|---|---|---|---|---|
| 402,600 A | * | 5/1889 | Kemp ..................... | 138/90 |
| 1,177,338 A | * | 3/1916 | Kayfetz ................... | 138/90 |
| 1,348,332 A | * | 8/1920 | Stremel ................... | 138/93 |
| 1,506,418 A | * | 8/1924 | Evensta et al. ........... | 138/90 |
| 1,510,212 A | * | 9/1924 | Du Bois .................. | 138/93 |
| 2,485,008 A | * | 10/1949 | Morris .................... | 138/93 |
| 4,354,515 A | * | 10/1982 | Sutherland .............. | 138/90 |
| 4,550,751 A | * | 11/1985 | Shimamura et al. ..... | 138/93 |
| 5,152,311 A | * | 10/1992 | McCreary ............. | 137/15.11 |
| 5,224,516 A | * | 7/1993 | McGovern et al. ..... | 138/97 |
| 5,651,393 A | * | 7/1997 | Danowski .............. | 138/97 |
| 5,894,863 A | * | 4/1999 | Lewis et al. ............ | 138/93 |
| 6,508,267 B1 | * | 1/2003 | Rippolone .............. | 138/97 |

* cited by examiner

Primary Examiner—George L. Walton
(74) Attorney, Agent, or Firm—William Nitkin

(57) ABSTRACT

A plumbing tool and its method of use are disclosed wherein the plumbing tool includes a tube for insertion into a pipe beyond an area of such pipe that is to be soldered, such tube having an inflatable balloon structure at one end thereof. After the tube is inserted in the pipe and the balloon structure is positioned at the location where fluid stoppage is desired, the balloon structure is inflated to allow for soldering operations to be completed. A water bypass can be disposed within such tube for directing any fluid flow to the exterior of the pipe.

4 Claims, 1 Drawing Sheet

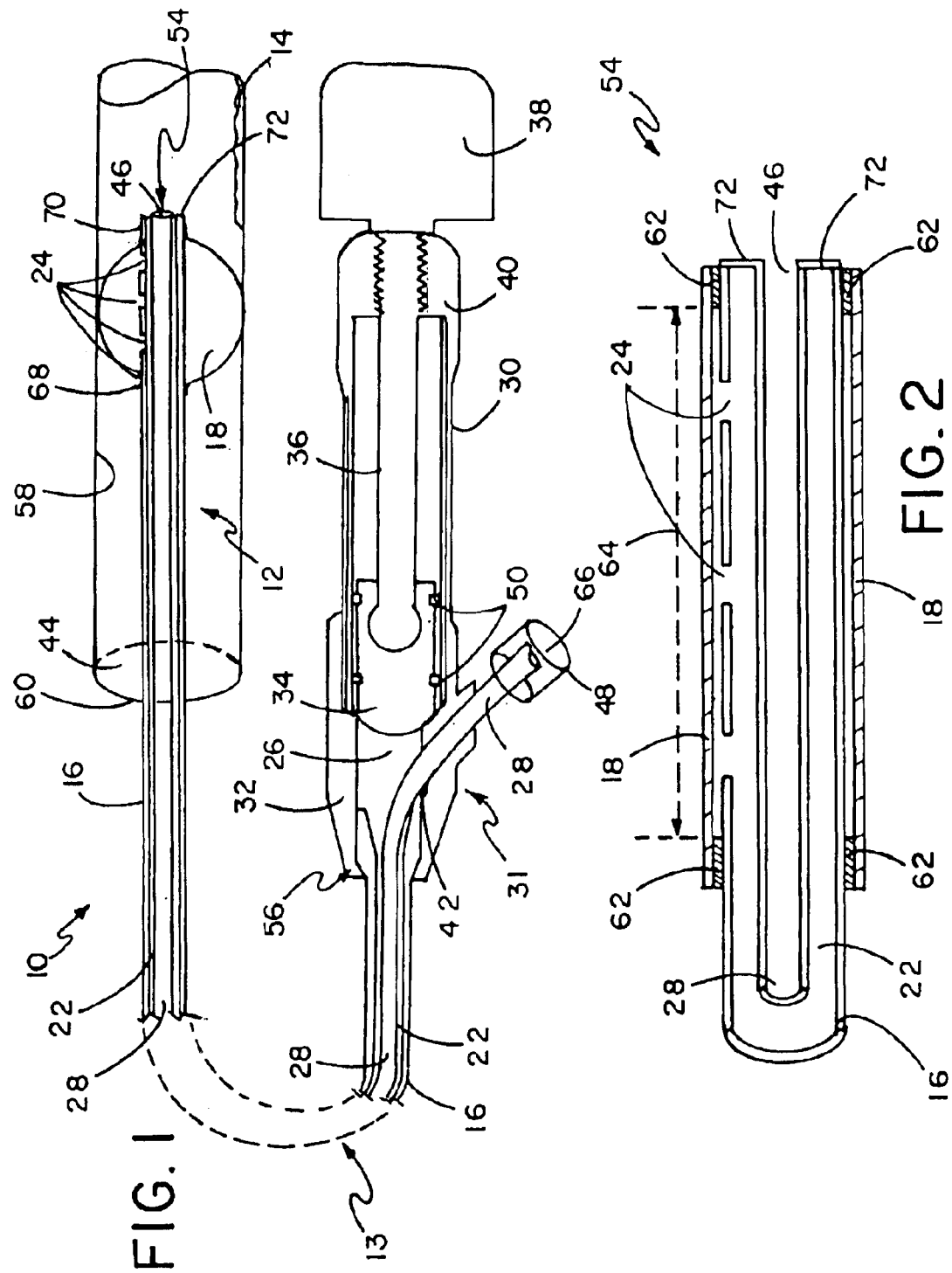

PLUMBING TOOL

BACKGROUND OF THE INVENTION

1. Field of the Invention

The device of this invention resides in the area of plumbing tools and more particularly relates to a tool that stops fluid flow in a pipe to an area of such pipe where soldering is to occur, such tool having a balloon-like structure at one end thereof that inflates within the pipe for blocking fluid flow and upon deflation, allows fluid to pass.

2. History of the Prior Art

A well known problem in soldering plumbing pipes is the difficulty in achieving good soldering joints when water is still draining through the pipes. Water draining from upstream locations often interferes with soldering and in the past efforts have been made to prevent such water flow, such as by plugging the pipe above the area of soldering or even by freezing the pipe which causes frozen water in the pipe to form a plug to block water flow. Over the years other devices have been developed to temporarily stop such water flow such as by inserting a removable plug into the pipe to be soldered.

SUMMARY OF THE INVENTION

It is an object of this invention to provide a plumbing tool for temporarily plugging a pipe to prevent water flow to a portion of a pipe where soldering is to occur. The device of this invention also provides an inner water escape tube for water drainage beyond the area of soldering while preventing any water flow through the pipe that might prevent the formation of a good solder joint. The device of this invention further compensates for irregular surfaces on the inner walls of older pipes that often form due to mineral deposits.

A tube member is provided comprised of an outer tube through the length of which a longer inner water escape tube passes. The first end of the tube member is inserted into the opening of a pipe to be soldered which tube member is flexible and can pass easily through the opening of any fitting that is to be soldered to the end of the pipe. Once the first end of the tube member is in place, a deflated balloon-like structure, herein referred to as a balloon, which is disposed around the first end of the tube member is inflated from an air supply unit attached to the second end of the tube member, such air supply unit containing a piston, until the balloon makes water-sealing contact with the inside wall of the pipe, thereby blocking further water flow down the pipe.

The air supply unit is composed of a cylinder in which is disposed a piston and attached piston shaft. A first cylinder cap is disposed at the first end of the cylinder, and a second cylinder cap is disposed at the second end of the cylinder. A piston handle is attached to the piston shaft beyond the second end of the cylinder. At least one O-ring can be disposed around the piston to create an airtight seal with the inner wall of the cylinder. The second end of the outer tube is attached to the first cylinder cap. An airtight air chamber is defined in the first cylinder cap between the piston, the inner walls of the first cylinder cap and the second end of the outer tube. The second end of the inner water escape tube passes through the air chamber and exits through an inner water escape tube aperture in the first cylinder cap into which aperture the inner water escape tube is engaged in an airtight fashion. The area between the outer tube and the inner water escape tube forms an air channel therebetween. Air pressure exerted on air in the air chamber is in communication with the air channel within the tube member. An air aperture at the first end of the outer tube allows air to pass from the air channel into the balloon. The piston moves within the cylinder by action on a piston handle attached to the piston shaft which piston shaft extends out of the second cylinder cap such that by movement of the piston handle, the piston shaft and attached piston can be moved back and forth within the cylinder. The O-ring(s) around the piston create an airtight seal such that piston movement in the direction of the first cylinder cap pressurizes air within the air chamber which passes pressurized air through the air channel to the air aperture(s) located at the first end of the outer tube, causing such pressurized air to inflate the balloon which is placed in the desired position within the pipe. In some embodiments the piston shaft can be threaded within the second cylinder cap with mating threads disposed in the second cylinder cap to allow for rotational movement of the piston handle to accurately control of the expansion or contraction of the balloon. The balloon of this invention, since it is not rigid or fixed in diameter, will conform as it expands radially to any surface irregularity present on the inside of the pipe to afford a complete seal to any water flow. The inner water escape tube at its first end has a water escape tube opening to receive water coming from upstream of the balloon that is plugging water flow in the pipe such that upstream water passes into the inner water escape tube opening and through the inner water escape tube to the point where such inner water escape tube passes through the water escape tube aperture formed in the first cylinder cap to the inner escape tube's exit opening and the water can drain out such opening at the second end of the inner water escape tube. A removable cap can be applied to the exit opening at the end of the water escape tube.

When one wishes to disengage the plumbing tool of this invention from the pipe, one maneuvers the piston handle in a direction which moves the piston rearward, reducing air pressure in the air chamber and air channel which action then pulls air back through the air aperture(s) to cause the deflation of the balloon. The tube member including the outer tube and inner water escape tube can then be pulled out of the pipe.

BRIEF DESCRIPTION OF THE DRAWINGS

FIG. 1 illustrates a side cross-sectional view through the plumbing tool of this invention installed in a pipe.

FIG. 2 illustrates a side cross-sectional view of the first end of the tube showing the balloon deflated.

DESCRIPTION OF THE PREFERRED EMBODIMENT(S)

FIG. 1 illustrates a side cross-sectional view of the plumbing device of this invention showing its balloon expanded, blocking water flow in a pipe. Seen in this view is pipe 12 with first end 54 of outer tube 16 of the device of this invention inserted therein through pipe opening 44 with balloon 18 expanded to conform to, and seal against, inner wall 58 of pipe 12, thereby blocking flow of water 14 from passing further down pipe 12 so that it will not interfere with any soldering that is to occur at end 60 of pipe 12. Outer tube 16 can be made of a flexible, heat-resistant plastic material. Balloon 18 having first end 70 and second end 68, can be made of a flexible, rubber-like material. Balloon 18 surrounds first end 54 of outer tube 16. First and second ends 70 and 68 of balloon 18, as seen in FIG. 2, can be adhered by adhesive 62 or heat-sealing means to the exterior of the first end 54 of outer tube 16, but the balloon's inner portion 64 is not adhered to outer tube 16. One or more air apertures 24 are defined in first end 54 of outer tube 16 within the area enclosed by inner portion 64 of balloon 18, being the non-adhered portion, such that when pressurized air passes through air aperture(s) 24, balloon 18 inflates until it comes in contact with inner wall 58 of pipe 12 which it then urges against to form a watertight seal, preventing water 14 from flowing downstream in pipe 12. Within outer tube 16 is positioned inner water escape tube 28 which passes through the length of outer tube 16 from first end 54 and beyond outer tube's second end 56, as described further below. The first end of inner water escape tube 28 is sealably engaged at seal 72 to the first end of outer tube 16 to prevent further air passage through air channel 22. Second end 56 of outer tube 16 is attached in an airtight fashion to first cylinder cap 32. First cylinder cap 32 has an inner water escape tube aperture 42 through which second end 56 of inner water escape tube 28 passes, terminating at end 66 which is exterior to cylinder 30. A removable cap 48 can be positioned on end 66 of inner water escape tube 28 for use at times when water drainage is not desired. At the first end of inner water escape tube 28 is located water escape opening 46 through which water 14 can pass down inner water escape tube 28 to exit out of end 66 of inner water escape tube 28. If removable cap 48 is not in position, the water is free to pass out end 66 which action will release water pressure buildup within pipe 12. If water flow within pipe 12 is small and there is no significant pressure buildup, it may not be necessary to release such water. Within first cylinder cap 32 is defined an air chamber 26 which is in communication with the air space between the inside of outer tube 16 and the exterior of water escape tube 28 which air space forms air channel 22 which is in communication with air aperture(s) 24. A piston 34 moving within cylinder 30 can pressurize the air in air chamber 26 to force air through air channel 22 and air aperture(s) 24 into balloon 18 in order to inflate balloon 18 to conform to, and seal against, inner wall 58 of pipe 12. Since only a small volume of air flow is needed to inflate balloon 18, the forward movement of piston 34 is small. In some embodiments piston shaft 36 can be threaded within second cylinder cap 40 with mating threads disposed in second cylinder cap 40 to allow for rotational movement of piston handle 38 to accurately control the expansion or contraction of balloon 18. Piston handle 38 can be rotated in one direction to move piston 34 forward to pressurize air chamber 26 and inflate balloon 18 and can be rotated in the other direction to move piston 34 rearward away from air chamber 26 to depressurize air chamber 26 and deflate balloon 18. Piston 34 can have at least one piston O-rings 50 disposed therearound for an airtight seal within cylinder 30.

When one wishes to remove tube member 13 from pipe 12, one moves piston handle 38 which controls the piston shaft, causing piston 34 to more rearwards within cylinder 30 to decrease air pressure in air chamber 26, air channel 22, air aperture(s) 24 and within balloon 18, causing balloon 18 to deflate around first end 54 of outer tube 16 so that tube member 13 can be then pulled out and removed from pipe 12.

Although the present invention has been described with reference to particular embodiments, it will be apparent to those skilled in the art that variations and modifications can be substituted therefor without departing from the principles and spirit of the invention.

I claim:

1. A plumbing tool for use in a pipe having an inside wall and an open end, said pipe having upstream and downstream portions for fluid to flow therein, comprising:

an outer tube having a length, an exterior surface, a first end and a second end;

an inner water escape tube having a length, a first end and a second end, a first opening defined in said first end and a second opening defined in said second end, said inner water escape tube having a longer length than the length of said outer tube, said inner water escape tube positioned within said outer tube and defining an air channel therebetween;

an expandable balloon-like member disposed around said exterior surface of said outer tube at said first end of said outer tube, said balloon-like member having a first end and a second end, said first and second ends being adhered to said outer tube and leaving an expandable portion between said first and second ends of said balloon-like member that is not adhered to said outer tube;

at least one aperture defined in said first end of said outer tube forming an opening between said air channel and said expandable portion of said balloon-like member;

said inner water escape tube being sealably engaged to said first end of said outer tube at said first end of said outer tube;

air supply means for forcing air into said air channel such that air passing through said air channel enters through said aperture in said outer tube at the end of said outer tube into said balloon-like member, causing said balloon-like member to inflate when said balloon-like member located at said first end of said outer tube is positioned within a pipe at a selected location to block fluid flow downstream;

means for said inner water escape tube to exit from said air supplying means for allowing escape of fluid from said upstream portion of said pipe through said inner water escape tube when said balloon-like member is inflated while blocking fluid passage in said downstream portion of said pipe;

said air supply means includes a cylinder, said cylinder having a first end and a second end, an interior portion and an exterior surface, said cylinder having a movable piston disposed in said interior portion, said piston being movable in a forward direction and a rearward direction;

said second end of said outer tube is attached to said cylinder in an airtight relationship;

said inner water escape tube passes out said air supply means in an airtight fashion;

means to move said piston in a forward and rearward direction such that forward movement of said piston forces air through said air channel and said aperture(s) at said first end of said outer tube for inflating said balloon-like member, and rearward movement of said piston, when desired, causes retraction of air from said air channel and said aperture(s) at said first end of said outer tube for deflating said balloon-like member;

said cylinder further including a first cylinder cap engaged at said first end of said cylinder; and a second cylinder cap engaged to said second end of said cylinder wherein said piston can be moved with an airtight contact in said cylinder to force air through said air channel;

said first cylinder cap further including:

an air chamber defined between said piston and said air channel within said second end of said outer tube;

a piston shaft having a first and second end, said first end attached to said piston with said second end of said piston shaft passing through a shaft opening defined in said second cylinder cap;

a movable handle disposed on the second end of said piston shaft for movement of said piston in a forward direction within said cylinder for forcing from said air chamber to said air channel and for movement of said piston in a rearward direction within said cylinder body for retracting air in said air chamber and air channel, for inflation and deflation, respectively, of said balloon-like member; and an aperture defined therein for the passage therethrough of said second end of said inner water escape tube in an airtight relationship for the drainage of water from said first opening of said inner water escape tube at its first end upstream of said balloon-like member to said second opening of said inner water escape tube at its second end at a location beyond said exterior of said cylinder.

2. The tool of claim 1 further including:

threads disposed around said shaft opening in said second cylinder cap; and mating threads disposed on said piston shaft at its second end for forward and rearward movement of said piston by the manual rotation in a desired direction of said movable handle.

3. The tool of claim 2 further including a removable cap disposed at the second end of said inner water escape tube over said second opening of said inner water escape tube.

4. The tool of claim 3 wherein said outer tube is made of a flexible, heat-resistant material.

* * * * *